United States Patent Office 3,282,875
Patented Nov. 1, 1966

3,282,875
FLUOROCARBON VINYL ETHER POLYMERS
Donald James Connolly, Longwood, and William Franklin Gresham, Alapocas, Del., assignors to E. I. du Pont de Nemours and Company, Wilmington, Del., a corporation of Delaware
No Drawing. Filed July 22, 1964, Ser. No. 384,545
25 Claims. (Cl. 260—29.6)

This application is a continuation-in-part of application, Serial No. 308,650, filed September 13, 1963, now abandoned.

The present invention relates to novel fluorocarbon vinyl ethers and their polymers, and, more particularly, relates to fluorocarbon vinyl ethers and their polymers which contain sulfonic acid groups or derivatives thereof.

The fluorocarbon vinyl ethers of the present invention have the formula $$MSO_2CFR_fCF_2O[CFYCF_2O]_nCF{=}CF_2$$

where $R_f$ is a radical selected from the class consisting of fluorine and perfluoroalkyl radicals having from 1 to 10 carbon atoms, Y is a radical selected from the class consisting of fluorine and the trifluoromethyl radical, $n$ is an integer of 1 to 3 inclusive, and M a radical selected from the class consisting of fluorine, the hydroxyl radical, the amino radical and radicals having the formula —OMe where Me is a radical selected from the class consisting of alkali metals and quaternary ammonium radicals. The vinyl ethers are readily homopolymerizd or copolymerized with ethylene or halogenated ethylenes. Although the ethylenes are the preferred comonomers for the copolymerization of the vinyl ethers of the present invention, it is to be understood that copolymerization of the vinyl ethers can be achieved with any ethylenically unsaturated comonomer capable of homopolymerization, using the polymerization techniques described hereinbelow.

Additional fluorinated monomers may also be copolymerized with ethylene or the halogenated ethylenes and the fluorocarbon vinyl ethers of the present invention. In particular, a perfluoro(alkyl vinyl ether) or a perfluoro alpha-olefin is a preferred third monomer for copolymerization.

The solid products produced by copolymerization using the vinyl ethers of the present invention may be plastic or elastomeric. If elastomeric products are desired, the fluorocarbon vinyl ethers of the present invention which contain sulfonic acid groups or derivatives thereof can be polymerized in combination with two or more other monomers to produce multi-component copolymers.

In these polymers it is generally preferred that at least one of the additional monomers be ethylene or a halogenated ethylene such as vinylidene fluoride, tetrafluoroethylene, or chlorotrifluoroethylene, while the other additional monomer is a perfluoro alpha-olefin such as hexafluoropropylene or a perfluoro(alkyl vinyl ether) of the type $CF_2{=}CF{-}O{-}(CF_2)_n{-}CF_3$ where $n$ is 0 to 5, inclusive.

The concentration of fluorocarbon vinyl ethers of the present invention which contain sulfonic acid groups or derivatives thereof is chosen in relation to the degree of cross-linkability desired for the copolymer product. For economic reasons, 5 mole percent, based on total monomer incorporated into the copolymer, is usually all that is used to produce high modulus vulcanized products, while 0.2 mole percent is about the minimum which will produce a satisfactory degree of crosslinking. For example, when copolymers are prepared from vinylidene fluoride, hexafluoropropylene and a perfluorovinyl ether of the structure $$CF_2{=}CF{-}O{-}CF_2{-}CF(CF_3){-}O{-}CF_2CF_2{-}SO_2F$$

good elastomers are obtained when the molar ratio of vinylidene fluoride to hexafluoropropylene lies within the range of 51:49 to 85:15 and the proportion of the fluorocarbon vinyl ether is present in the range of about 0.2 mole to 5 mole percent of the total monomer units present in the copolymer.

In the preparation of elastomeric copolymers from tetrafluoroethylene, perfluoro(methyl vinyl ether) and a perfluorovinyl ether of the structure $$CF_2{=}CF{-}O{-}CF_2{-}CF{-}(CF_3)$$
$$\qquad\qquad\qquad\qquad{-}O{-}CF_2{-}CF_2{-}SO_2F$$

a preferred range of molar ratios is 1.5–2.0 moles of tetrafluoroethylene per mole of perfluoro(methyl vinyl ether) with 0.5–4 mole percent of the total composition of the sulfonyl fluoride monomer.

The vinyl ethers of the present invention are prepared by the pyrolysis of compounds having the following formulas $$FSO_2CFR_fO[CFYCF_2O]_nCF(CF_3)COF$$
and
$$FSO_2CFR_fO[CFYCF_2O]_nCF(CF_3)COOX$$

where $R_f$, Y and $n$ have the same meaning as above and X is an alkali metal. The pyrolysis is carried out at temperatures of 200 to 600° C. In the case of the acid fluoride, a metal oxide such as zinc oxide or silica is preferably employed as a solid catalyst for the gas phase reaction. The acid fluoride employed in the pyrolysis is obtained by the reaction of hexafluoropropylene epoxide with a fluorosulfonyl fluoroacyl fluoride having the formula $FSO_2CFR_fCOF$. The alkali metal salt of the carboxylic acid is formed from the corresponding acid fluoride by reaction with an alkali metal salt of a weak acid, such as carbonic acid. The formation of the acid fluoride and the alkali metal salt is further disclosed in copending application Serial No. 300,076, filed August 5, 1963.

The vinyl ethers of the present invention are preferably polymerized in a perfluorocarbon solvent using a perfluorinated free radical initiator. Since the vinyl ethers are liquid at reaction temperatures, it is further possible to polymerize and copolymerize the vinyl ethers in bulk without the use of a solvent. It is preferable to polymerize the vinyl ether in the form of the sulfonyl fluoride when using a perfluorocarbon system. Polymerization temperatures will vary from −50 to +200° C. depending on the initiator used. Pressure is not critical and is generally employed to control the ratio of the gaseous comonomer to the fluorocarbon vinyl ether. Suitable fluorocarbon solvents are known in the art and are generally perfluoroalkanes or perfluorocycloalkanes, such as perfluoroheptane or perfluorodimethylcyclobutane. Similarly, perfluorinated initiators are known in the art and include perfluoroperoxides and nitrogen fluorides.

In the form of the acid or the acid salt the fluorocarbon ethers of the present invention can be polymerized in an aqueous medium using a peroxide or a redox initiator. The polymerization methods employed correspond to those established in the art for the polymerization of tetrafluoroethylene in aqueous media.

In preparing copolymers using the fluorocarbon vinyl ethers of the present invention which contain sulfonic acid groups or derivatives thereof, it is generally preferred to use aqueous media of a pH of 8 or lower and temperatures not above about 110° C.

The polymeric fluorocarbon vinyl ethers of the present invention are liquid or solid depending on their degree of polymerization. The sulfonyl group in the polymer is readily subjected to known reactions of sulfonyl groups and can thus be employed to form a variety of polymeric sulfonyl group containing materials.

Copolymers containing the fluorocarbon vinyl ethers of the present invention can be vulcanized using the —$SO_2F$ group or derivatives thereof, such as the —$SO_2OH$ or —$SO_3Na$ groups, by heating in the presence of metal oxides such as PbO or mixtures of PbO and MgO, or by reacting with polyfunctional reagents capable of reacting with sulfonyl fluorides, such as diamines.

The invention is further illustrated by the following examples.

*Example I*

Into a rotary evaporator was charged 200 g. of $$FSO_2CF_2CF_2OCF(CF_3)CF_2OCF(CF_3)CO_2Na$$

The evaporator was heated to 180° C. until no further gas evolution was observed. The off-gases from the reaction were condensed in a cold trap. On distillation, there was obtained 48 g. of perfluoro[2-(2-fluorosulfonylethoxy)propyl vinyl ether], B.P. 118° C. The infrared and NMR spectra of the product were consistent with the structure of the ether.

*Analysis.*—Calcd. for $C_7F_{14}O_4S$: C, 18.84; F, 59.62; S, 7.18. Found: C, 19.11; F, 59.13; S, 7.11.

*Example II*

Into a rotary evaporator was charged 150 g. of $$FSO_2CF_2CF_2O[CF(CF_3)CF_2O]_2CF(CF_3)CO_2Na$$

The evaporator was heated to 200° C. until no further gas evolution was observed. The off-gases from the reaction were condensed in cold traps. On distillation of the reaction product there was obtained 35 g. of $$FSO_2CF_2CF_2O[CF(CF_3)CF_2O]_2CF=CF_2$$

having a boiling point at 159° C. Infrared and NMR spectra was consistent with the indicated structure.

*Example III*

The fluorosulfonyl fluoroacyl fluoride, having the formula $FSO_2CF_2OCF(CF_3)CF_2OCF(CF_3)COF$, was passed through a one inch stainless steel column packed with ¼ inch pellets of ZnO and heated to a temperature of 285° C. The fluorosulfonyl fluoroacyl fluoride, 85 g., was vaporized by dripping on a flash evaporator in a nitrogen stream of 400 ml./min. The nitrogen stream was then passed through the column and multiple cold traps in which the reaction product was collected. Upon separation, there was obtained 60 g. of the perfluoro[2-(2-fluorosulfonylethoxy)propyl vinyl ether].

*Example IV*

The procedure of Example III is repeated using spherical glass beads (200 to 325 mesh) at a temperature of 325° C. instead of ZnO and a temperature of 285° C. Yields of the perfluorovinyl ether of up to 80% are obtained.

*Example V*

Perfluoro [2 - (2 - fluorosulfonylethoxy) - propyl vinyl ether] was dissolved in an alkaline acetone water mixture which resulted in the formation of the corresponding sodium salt. The isolated salt was treated with a concentrated solution of HCl to form the corresponding sulfonic acid ether $SO_3HCF_2CF_2OCF(CF_3)CF_2OCF=CF_2$. Reaction of the sulfonic acid ether with aqueous sodium hydroxide or triethylamine resulted in the formation of the corresponding pure sodium salt or triethyl ammonium salt.

*Example VI*

About 0.5 g. of perfluoro[2-(2-fluorosulfonylethoxy) propyl vinyl ether] is placed in a quartz tube which is then evacuated and sealed. After 24 hours irradiation with a mercury arc lamp, a clear viscous homopolymer is obtained.

*Example VII*

Using the procedure of Example VI, the vinyl ether having the formula $$FSO_2CF_2CF_2[O—CF(CF_3)CF_2]_2OCF=CF_2$$

is polymerized to a clear viscous homopolymer.

*Example VIII*

Into an evacuated 320 ml. stainless steel shaker tube were charged 40 g. of the vinyl ether, $$FSO_2CF_2CF_2OCF(CF_3)CF_2OCF=CF_2$$

40 g. of tetrafluoroethylene and 200 ml. of perfluorodimethylcyclobutane. While cold, a 30 ml. jumper line was pressured to 20 p.s.i.g. with 2.4 volume percent difluorodiazine in nitrogen. This catalyst was pressured into the shaker tube with 800 p.s.i. of nitrogen. The mixture was shaken and the temperature raised slowly to 80° C. and maintained there for one hour. On cooling and discharging, 28 g. of 9 weight percent vinyl ether copolymer having melt viscosity above $1 \times 10^4$ poises was obtained. The polymer could be compression molded into clear tough film.

*Example IX*

Into an evacuated 320 ml. stainless steel maker tube were charged 30 g. of purified vinyl ether having the formula $NaSO_3CF_2CF_2OCF(CF_3)CF_2OCF=CF_2$, 200 ml. of deoxygenated, distilled water, about 30 g. of tetrafluoroethylene and 1.0 g. of ammonium persulfate. The reaction mixture was heated under autogenous pressure to 68–70° C. for 2 hours. On discharging 48 g. of gelatinous copolymer was obtained which after drying could be made into films of good stiffness and contained 14 weight percent of the vinyl ether.

*Example X*

Into the 85 ml. stainless steel shaker tube were charged 60 ml. of deoxygenated distilled water, 0.3 g. of dry ammonium persulfate, 2.5 g. of a vinyl ether having the formula $NaSO_3CF_2CF_2OCF(CF_3)CF_2OCF=CF_2$ and 6 to 10 g. of tetrafluoroethylene. The mixture was agitated at 68° C. for 3 hours under autogenous pressure and a clear aqueous copolymer dispersion was discharged.

This procedure is readily employed with other ethylenes, such as chlorotrifluoroethylene, vinylidene fluoride, vinyl fluoride, vinyl chloride, vinylidene chloride and ethylene to give rise to aqueous dispersions of copolymers of these ethylenes with $$NaSO_3CF_2CF_2OCF(CF_3)CF_2OCF=CF_2$$

*Example XI*

To 100 ml. of a 50 weight percent aqueous NaOH solution and 100 ml. of methanol is added 60 g. of a copolymer of tetrafluoroethylene and $$FSO_2CF_2CF_2OCF(CF_3)CF_2OCF=CF_2$$

contining 5 weight percent of the vinyl ether. The reaction mixture was refluxed for 4 hours. The copolymer was then washed with water to remove excess base. Infrared analysis indicated complete neutralization of the —$SO_2F$ groups to —$SO_3Na$ groups. The resulting resin could be molded into tough clear films.

*Example XII*

Using the procedure of Example XI, a 2–4 mil film of a copolymer of tetrafluoroethylene and $$FSO_2CF_2CF_2OCF(CF_3)CF_2OCF=CF_2$$

was placed in refluxing NaOH-methanol. The resultant film was clear and contained —$SO_3Na$ groups as indicated by infrared analysis.

*Example XIII*

The coagulated tetrafluoroethylene copolymer of Example X was washed with one liter of 10 percent HCl in portions. The resultant resin was then washed with water to remove excess acid. Infrared analysis indicated essentially complete conversion of the —SO₃Na groups to —SO₃H groups.

*Example XIV*

Into a platinum lined shaker tube were charged 2 g. of an eight weight percent copolymer of a vinyl ether having the formula

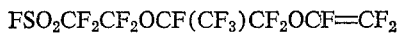

with tetrafluoroethylene and 10 g. of $NH_3$. The reaction mixture was agitated for 4 hours under autogenous pressure at a temperature of 100° C. Infrared analysis of the resultant copolymer indicated essentially complete formation of —$SO_2NH_2$ groups from the —$SO_2F$ groups.

*Example XV*

Into a Carius tube were charged 0.75 g. of a vinyl ether having the formula

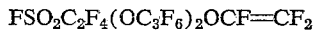

and 20 ml. of perfluorodimethylcyclobutane. The mixture was frozen, the tube evacuated and 2 g. of tetrafluoroethylene added. About 30 cc., at atmospheric pressure, of 2.4% $N_2F_2$ in $N_2$, was injected and polymerization was carried out at room temperature in the sealed tube for a period of 24 hours. A copolymer of the vinyl ether and tetrafluoroethylene was obtained.

*Example XVI*

To 400 ml. of water was added 7 g. of a copolymer of tetrafluoroethylene and perfluoro-[2-(2-fluorosulfonylethoxy) propyl vinyl ether] and 6 g. of triethylamine. The reaction mixture was refluxed for 96 hours. The —$SO_2F$ groups of the copolymer were substantially completely converted to —$SO_3NHEt_3$ groups.

*Example XVII*

Into a horizontal autoclave of 2 gallon capacity is charged 1 liter of deoxygenated distilled water, 5 g. of ammonium perfluorocaprylate, and 239 g. of perfluoro [2-(fluorosulfonylethoxy)propyl vinyl ether]. The free space of the autoclave is evacuated and filled with gaseous tetrafluoroethylene. The mixture is stirred with horizontal paddles at 105 r.p.m. and heated to 85° C. The tetrafluoroethylene pressure is adjusted to 50 p.s.i.g. A solution of 1 g. of ammonium persulfate in 500 ml. of water is pumped into the reactor followed by 250 ml. of water to purge the pump and injection line. Tetrafluoroethylene is supplied to maintain the pressure at 50 p.s.i.g. during the polymerization period. After 71 minutes of polymerization the mixture is cooled and removed from the reactor. Two liquid phases are obtained, the upper phase being an aqueous dispersion of copolymer and the lower phase being the unreacted perfluoroether.

The upper layer is separated and coagulated by high speed stirring to give 294 g. of copolymer containing 17 weight percent perfluoro[2-fluorosulfonylethoxy)propyl vinyl ether].

*Example XVIII*

A 400 ml. Hastelloy C shaker tube was flushed with nitrogen and charged successively with a solution of 0.20 g. of ammonium perfluorooctanoate (Fluorochemical FC–126, Minnesota Mining & Mfg. Co.) in 250 ml. of deoxygenated distilled water; 1.00 g. of potassium persulfate; and 2.4 g. of perfluoro[2-(fluorosulfonylethoxy)-propyl vinyl ether]. The tube was immediately closed, chilled to −78° C., evacuated, and then charged successively with 14.5 g. of perfluoro(methyl vinyl ether) and 6.5 g. of tetrafluoroethylene. The tube was shaken at 60° C. for 4 hours.

After cooling the tube and venting the unreacted gaseous monomers, the tube was opened and a liquid latex-like product was discharged. This was washed twice with approximately 50 ml. for each washing of 1,1,2,-trichloro-perfluoroethane to remove unreacted, nonvolatile fluorosulfonyl monomer and then coagulated by freezing. The polymeric product was separated from the aqueous phase by filtration and macerated in a high-speed mixer with water to remove electrolytes. The resulting wet polymer was vacuum-dried for 80 hours at 25° C. under a pressure of 0.1 mm. mercury. The weight of the dried terpolymer of perfluoromethyl vinyl ether, tetrafluoroethylene and perfluoro[2 - (fluorosulfonylethoxy)-propyl vinyl ether] was 8.3 grams.

The infrared absorption spectrum of a thin film of the polymeric product was measured. An absorption band at 11.27μ indicated the presence of the —$OCF_3$ group and absorption bands at 6.80μ and 10.15μ indicated the presence of the —$SO_2F$ group. Absorption bands attributed to the fluorine attached to carbon were also present.

One hundred parts by weight of the terpolymer were mixed with 20 parts by weight of litharge on a two-roll rubber mill. The mix was removed from the mill and shaped and cured in the form of a film approximately 1 mm. thick by pressing it at 125° C. for 30 minutes between the heated platens of a hydraulic press. The cured film exhibited an elongation at break of 150 percent and a permanent set at break of about 5 percent. It was insoluble in perfluorodimethylcyclohexane whereas the uncured terpolymer was soluble.

*Example XIX*

A 400 ml. Hastelloy shaker bomb is swept with nitrogen and charged with 200 ml. of deoxygenated distilled water, 3.0 g. (11.0 mmoles) of disodium phosphate heptahydrate, 0.55 g. (2.4 mmoles) of sodium bisulfite, 0.15 g. (0.3 mmole) of ammonium perfluorooctanoate, and 5.0 g. (11.0 mmoles) of perfluoro[2-(2-vinyloxy-1-methylethoxy)-ethane sulfonyl]fluoride. The bomb is closed, cooled to −80° C., and purged of oxygen by evacuating to one millimeter pressure of mercury. With the interior under reduced pressure, 18.1 g. (0.12 mole) of hexafluoropropene and 28.0 g. of vinylidene fluoride (0.44 mole) are introduced. The bomb is shaken and the temperature inside the reaction chamber is increased to 60° C. and held there for two hours. The bomb is then cooled to room temperature, and excess gaseous reactants vented to the atmosphere. The partially coagulated product is removed and coagulation is completed by freezing. The polymer is isolated by filtration, washed thoroughly with water, and dried overnight at 70° C. in a vacuum oven. The dry, white polymer weighed 37.6 g. Analysis for carbon, hydrogen, fluorine and sulfur showed that the product contains 32.7 percent C; 2.2 percent H; 63.5 percent F and 0.23 percent S.

The product is compounded on a two-roll rubber mill to contain the following:

| | Parts by weight |
|---|---|
| Terpolymer | 100 |
| Carbon black, medium thermal | 20 |
| MgO | 12 |
| PbO | 3 |

This compound stock is vulcanized by pressing sheets in a mold for 30 minutes at 150° C followed by removing the sheets and heating them in an air oven for 24 hours at 204° C.

The following physical properties were measured at 21.1° C.:

| | |
|---|---|
| Tensile strength, p.s.i. | 1625 |
| Elongation at break, percent | 340 |
| Stress at 200 percent elongation, p.s.i. | 1175 |

*Example XX*

A 400 ml. Hastelloy shaker bomb is swept with nitrogen and charged with 200 ml. of deoxygenated distilled water, 3.0 g. (11 mmoles) of disodium phosphate heptahydrate, 0.55 g. (2.4 mmoles) of ammonium persulfate, 0.15 g.

(0.3 mmole of ammonium perfluorooctanoate, 0.25 g. (2.4 mmoles) of sodium bisulfite, and 2.5 g. (6.0 mmoles) of perfluoro[2 - (2 - vinyloxy-1-methylethoxy)-ethane sulfonyl] fluoride. The bomb is closed, cooled to −80° C., and purged of oxygen by evacuating to millimeter pressure of mercury. With the interior under reduced pressure 17.3 g. (0.115 mole) of hexafluoropropene and 27.5 g. (0.43 mole) of vinylidene fluoride are introduced. The bomb is shaken and the temperature inside the reaction chamber is increased to 60° C. and held there for two hours. The bomb is then cooled to room temperature, and excess gaseous reactants vented to the atmosphere. The partially coagulated product is removed. Coagulation is completed by freezing. The polymer is isolated by filtration, washed thoroughly with water, and dried overnight at 70° C. in a vacuum oven. The dry white polymer weighed 31.2 g. Analysis for carbon, hydrogen, fluorine and sulfur showed that the product contains 33.1 percent C; 2.1 percent H; 63.4 percent F and 0.8 percent S.

The polymer is compounded on a two-roll rubber mill at 25° C. to contain the following:

| | Parts by weight |
|---|---|
| Terpolymer | 100 |
| Carbon black, medium thermal | 20 |
| MgO | 15 |
| Hexamethylene diaminecarbamate | 0.25 |

A portion of this compounded stock is pressed in a mold for 30 minutes at 100° C. to form a sheet. The resulting vulcanizate has a tensile strength at the break of 1275 p.s.i. and an elongation at the break of 160 percent.

Another portion of this compounded stock is pressed in a mold for 30 minutes at 100° C. to form a sheet. The sheet is removed from the mold, and is then heated in an oven to 204° C. over a four hour interval and held to that temperature for 24 hours. The resulting vulcanizate has the following physical properties measured at 21.1° C.:

| | |
|---|---|
| Tensile at break, p.s.i. | 2350 |
| Elongation at break, percent | 300 |
| Stress at 200 percent elongation, p.s.i. | 1725 |

*Example XXI*

A 400 ml. stainless steel shaker tube is swept with nitrogen and charged with 100 ml. of deaerated distilled water, 0.3 gm. of ammonium perfluorooctanoate, 0.95 gm. of potassium persulfate, 2.5 gm. of disodium hydrogen phosphate heptahydrate, 0.2 gm. of sodium sulfite, and 3.03 gm. (.0068 mole) of perfluoro[2-(2-vinyloxy-1-methylethoxy)ethane sulfonyl]fluoride. The tube is closed, cooled in Dry Ice/acetone and evacuated to one millimeter of mercury pressure. To the evacuated tube is then introduced 34.2 gm. (.206 moles) of perfluoro (methyl vinyl ether), followed by 12.7 gm. (.127 mole) of tetrafluoroethylene. The shaker tube is heated and agitated for 8 hours at 50° C. The latex formed by the reaction is coagulated by freezing in a Dry Ice/acetone bath. After warming to room temperature, the solid polymer is separated by filtration and washed thoroughly with water to remove soap and inorganic salts. The polymer is dried in a hood at room temperature for 2 days, followed by a few minutes milling on a 2-roll rubber mill at 100° C. to remove any remaining water. The inherent viscosity of a 0.1 percent solution of the polymer in 2,3 dichloroperfluorobutane at 30° C. is 1.15 with 80 percent of the polymer being soluble. Infrared spectra analyses on pressed films of 1–2 mil thickness show that the polymer contains about 37 mole percent of perfluoro(methyl vinyl ether) and about 0.8 mole percent of perfluoro[2-(2- vinyloxy-1-methylethoxy)ethane sulfonyl]fluoride. After heating the polymer in an oven at 288° C. there is a weight loss of 2.1 percent after 100 hours and 8.7 percent after 585 hours.

*Example XXII*

One hundred parts of a mixture of polymers prepared according to the method of Example XXI is compounded on a 2-roll rubber mill with 20 parts of litharge and 20 parts of medium thermal carbon black. The composition is sheeted off the mill and vulcanized into various test specimens by heating for 30 minutes at 175° C. under pressure in a mold, removing the formed parts from the mold and then heating them at atmospheric pressure, by gradually raising the temperature to 204° C. over a 12 hour period, followed by treatment at 204° C. for 24 hours more. The following physical properties are obtained:

| | |
|---|---|
| Tensile strength—p.s.i. at 25° C. | 1570 |
| Percent elongation at break at 25° C. | 260 |
| Percent permanent set at 25° C. | 12 |
| ASTM: D676–59T hardness (Duro A) at 25° C. | 76 |
| ASTM: D676–59T hardness (Duro A) at 100° C. | 65 |
| ASTM: D945–59 resilience at 25° C. | 19 |
| ASTM: D945–59 resilience at 100° C. | 61 |
| ASTM: D395–61 compression set at 121° C. | 86 |
| Temperature where torsional stiffness is 10,000 pounds per square inch ° C. | −4.44 |

*Example XXIII*

A. A polymer containing the three monomers of Example XXI is prepared, wherein the concentration of perfluoro(methyl vinyl ether) is about 36 mole percent, and the concentration of perfluoro[2-(2 vinyloxy-1-methyl-ethoxy)ethane sulfonyl]fluoride is about 0.21 mole percent. After heating the polymer at 288° C. for 327 hours there is a weight loss of 3.4 percent.

B. On a 2-roll rubber mill 100 parts of the polymer from A is compounded with 20 parts of magnesium oxide. Test specimens are prepared by vulcanizing the composition for 30 minutes at 175° C. under pressure in a mold, removing the formed parts from the mold and then heating them at atmospheric pressure by gradually raising the temperature to 204° C. over a 12 hour period, followed by treatment at 204° C. for 24 hours more.

C. The procedure of B is followed, except magnesium oxide is replaced by calcium oxide.

D. The procedure of B is followed except magnesium oxide is replaced by litharge, and 20 parts of medium thermal carbon black is added.

The above elastomer compositions have the following physical properties:

| | B | C | D |
|---|---|---|---|
| Tensile strength at 25° C., p.s.i. | 2,600 | 2,540 | 1,910 |
| Percent elongation at break at 25° C. | 240 | 240 | 290 |
| Percent permanent set at break | 10 | 35 | 7 |
| Percent weight loss at 288° C. after 20 hours | 0.7 | 1.0 | |
| Percent weight loss at 288° C. after 89 hours | 1.3 | 1.9 | |

*Example XXIV*

On a 2-roll rubber mill 100 parts of the polymer of Example XXIII "A" is compounded with 10 parts of "Maglite" Y magnesium oxide and 1 part of ethylenediaminecarbamate. Test sheets are prepared by vulcanizing the composition according to the procedure of Example XXIII "B." The following physical properties are obtained:

| | |
|---|---|
| Tensile strength—p.s.i. at 25° C. | 3360 |
| Tensile strength—p.s.i. at 100° C. | 740 |
| Percent elongation at break at 25° C. | 240 |
| Percent elongation at break at 100° C. | 180 |
| Percent permanent set at break at 25° C. | 7 |
| Percent permanent set at break at 100° C. | 4 |
| Temperature when torsional stiffness is 10,000 pounds per square inch ° C. | −1 |

Example XXV

A. A polymer containing the three monomers of Example XXI is prepared wherein the concentration of perfluoro (methyl vinyl ether) is about 38 mole percent and the concentration of perfluoro[2-(2-vinyloxy-1-methylethoxy)ethane sulfonyl]fluoride is about 0.38 mole percent. After heating for 186 hours at 288° C., the weight loss is 2.2 percent.

B. On a 2-roll rubber mill, 100 parts of the polymer from A is compounded with 10 parts of "Maglite" Y magnesium oxide; 20 parts of medium thermal carbon black and 1 part of ethylenediaminecarbamate. Test sheets are prepared by vulcanizing the composition according to the procedure of Example XXIII "B." The following physical properties are obtained:

| | |
|---|---|
| Tensile strength—p.s.i. at 25° C. | 2640 |
| Tensile strength—p.s.i. at 100° C. | 1000 |
| Percent elongation at break at 25° C. | 140 |
| Percent elongation at break at 100° C. | 80 |
| Percent permanent set at break at 25° C. | 1 |
| Percent permanent set at break at 100° C. | 1 |
| Temperature where torsional stiffness is 10,000 pounds per square inch ° C | −3 |
| Percent weight increase after 7 days immersion at 23.90 C. in: | |
| Acetone | 2 |
| Ethyl acetate | 1 |
| Toluene | 1 |
| Methylene chloride | 1 |
| Chloroform | 1 |
| Pyridine | 0 |
| Dimethyl formamide | 1 |
| Tetrahydrofuran | 1 |
| 70 percent nitric acid | 8 |
| "Freon" F-113 | 36 |

The polymeric vinyl ethers of the present invention which find utility as plastics can be moled or extruded into a variety of shapes. Of particular utility are aqueous dispersions of the vinyl ether polymer in which the vinyl ether contains an —SO₃Na group. These dispersions have the appearance of an aqueous sirup and are homogenous and transparent and may even contain the polymer in solution. The dispersions can be employed to coat metals and other surfaces and form coherent and continuous coatings without the requirement of sintering or melting the polymer. Such coatings are not redissolved or redispersed by prolonged contact with water. In this respect the polymers of the present invention differ from prior art fluorocarbon polymers all of which require sintering or melting to give rise to coherent coatings.

The polymeric vinyl ethers of the present invention which are useful as elastomers offer desirable combinations of properties such as heat resistance, chemical stability, and resistance to attack by many fluids which are used industrially such as those contained in hydraulic systems, dry-cleaning solvents and aircraft fuels.

The preparation of elastomeric products, such as seals, gaskets, grommets, etc., using the polymeric vinyl ethers, follows technology which is conventional for other fluoroelastomers, i.e., various fillers may be compounded into the polymers by milling, followed by molding under heat and pressure into various useful articles.

The polymeric vinyl ethers of the present invention are furthermore highly useful as ion exchange resins in that they contain sulfonyl groups. Thus, the resins can undergo exchange cycles, e.g., $RSO_3Na \to RSO_3Ca \to RSO_3Na \to RSO_3H$ by use of common reagents. The resins in their acid form can also be used as acid catalysts at elevated temperatures.

We claim:
1. A fluorocarbon ether having the general formula

$$MSO_2CFR_fCF_2O[CFYCF_2O]_nCF=CF_2$$

where $R_f$ is a radical selected from the class consisting of fluorine and perfluoroalkyl radicals having from 1 to 10 carbon atoms, Y is a radical selected from the class consisting of fluorine and the trifluoromethyl radical, $n$ an integer of one to three inclusive, and M a radical selected from the class consisting of fluorine, the hydroxyl radical, the amino radical and radicals having the formula —OMe where Me is a radical selected from the class consisting of alkali metals and quaternary ammonium radicals.

2. The fluorocarbon ether of claim 1 wherein $R_f$ is fluorine.

3. The fluorocarbon ether of claim 1 wherein M is a fluorine.

4. The fluorocarbon ether of claim 1 wherein M is a hydroxyl group.

5. A fluorocarbon ether having the formula $$FSO_2CF_2CF_2OCF(CF_3)CF_2OCF=CF_2$$

6. A fluorocarbon ether having the formula $$NaSO_3CF_2CF_2OCF(CF_3)CF_2OCF=CF_2$$

7. The method of preparing a fluorocarbon vinyl ether which comprises pyrolysing at a temperature of from 200 to 600° C. a fluorocarbon ether having the formulas selected from the class consisting of $$FSO_2CFR_fCF_2O[CFYCF_2O]_nCF(CF_3)COF$$

and $$FSO_2CFR_fCF_2O[CFYCF_2O]_nCF(CF_3)COOX$$

where $R_f$ is a radical selected from the class consisting of fluorine and perfluoroalkyl radicals having from 1 to 10 carbon atoms, Y is a radical selected from the class consisting of fluorine and the trifluoromethyl radical, $n$ an integer of one to three inclusive and X is an alkali metal.

8. A polymeric material containing the repeating structure $$\begin{array}{c} | \\ CF[OCF_2CFY]_nOCF_2CFR_fSO_2M \\ | \\ CF_2 \\ | \end{array}$$

where $R_f$ is a radical selected from the class consisting of fluorine and perfluoroalkyl radicals having from 1 to 10 carbon atoms, Y is a radical selected from the class consisting of fluorine and the trifluoromethyl radical, and M a radical selected from the class consisting of fluorine, the hydroxyl radical, the amino radical and radicals having the formula —OMe, where Me is a radical selected from the class consisting of alkali metals and quaternary ammonium radicals.

9. The homopolymer of the vinyl ether of claim 1.

10. The homopolymer of the vinyl ether having the formula $$FSO_2CF_2CF_2OCF(CF_3)CF_2OCF=CF_2$$

11. The homopolymer of the vinyl ether having the formula $$FSO_2CF_2CF_2O[CF(CF_3)CF_2O]_2CF=CF_2$$

12. The copolymer of the vinyl ether having the formula $$MSO_2CFR_fCF_2O[CFYCF_2O]_nCF=CF_2$$

where $R_f$ is a radical selected from the class consisting of fluorine and perfluoroalkyl radicals having from 1 to 10 carbon atoms, Y is a radical selected from the class consisting of fluorine and the trifluoromethyl radical, $n$ an integer from one to three inclusive, and M a radical selected from the class consisting of fluorine, the hydroxyl radical, the amine radical and radicals having the formula —OMe, where Me is a radical selected from the class consisting of alkali metals and quaternary ammonium radicals, and at least one monomer selected from the class (A) consisting of ethylene and halogenated ethylenes and at least one monomer selected from the class (B) consisting of perfluorinated alpha-olefins and perfluoro(alkyl vinyl ethers) having the formula $$CF_2=CF-O-(CF_2)_nCF_3$$

where $n$ is 0 to 5.

13. The copolymer of claim 12 where $R_f$ is fluorine.

14. The copolymer of the vinyl ether having the formula $$MSO_2CF_2CF_2OCF(CF_3)CF_2OCF=CF_2$$

where M is a radical selected from the class consisting of fluorine, the hydroxyl radical, the amino radical and radicals having the formula —OMe where Me is a radical selected from the class consisting of alkali metals and quaternary ammonium radicals, and tetrafluoroethylene.

15. A copolymer of the vinyl ether having the formula $$FSO_2CF_2CF_2OCF(CF_3)CF_2OCF=CF_2$$

and tetrafluoroethylene.

16. A copolymer of the vinyl ether having the formula $$MeOSO_2CF_2CF_2OCF(CF_3)CF_2OCF=CF_2$$

where Me is a radical selected from the class consisting of alkali metals and quaternary ammonium radicals and tetrafluoroethylene.

17. Copolymers of the vinyl ether having the formula $$MSO_2CF_2CF_2OCF(CF_3)CF_2OCF=CF_2$$

where M is a radical selected from the class consisting of fluorine, the hydroxyl radical, the amino radical and radicals having the formula —OMe where Me is a radical selected from the class consisting of alkali metals and quaternary ammonium radicals, and at least one monomer selected from the class (A) consisting of ethylene and halogenated ethylenes and at least one monomer selected from the class (B) consisting of perfluorinated alpha-olefins and perfluoro(alkyl vinyl ethers) having the formula $$CF_2=CF-O-(CF_2)_nCF_3$$

where $n$ is 0 to 5.

18. The copolymer of claim 17 where the vinyl ether is $$CF_2=CF-O-CF_2-CF(CF_3)-O-CF_2-CF_2-SO_2F$$

(A) is vinylidene fluoride and (B) is hexafluoropropylene.

19. The copolymer of claim 18 where the vinyl ether is $$CF_2=CF-O-CF_2-CF(CF_3)-O-CF_2-CF_2-SO_2F$$

(A) is tetrafluoroethylene, and (B) is a perfluoro(alkyl vinyl ether).

20. The copolymer of claim 18 where the vinyl ether is $$CF_2=CF-O-CF_2-CF(CF_3)-O-CF_2-CF_2-SO_2F$$

(A) is tetrafluoroethylene, and (B) is a perfluoro(methyl vinyl ether).

21. The method of forming a polymer of a vinyl ether having the formula $$FSO_2CFR_fCF_2O[CFYCF_2O]_nCF=CF_2$$

where $R_f$ is a radical selected from the class consisting of fluorine and perfluoroalkyl radicals having from 1 to 10 carbon atoms, Y is a radical selected from the class consisting of fluorine and the trifluoromethyl radical, and $n$ is an integer from one to three inclusive, which comprises polymerizing said vinyl ether in a perfluorinated solvent liquid at reaction temperatures with a perfluorinated free radical initiator.

22. The method of forming a polymer of a vinyl ether having the formula $$MeOSO_2CFR_fCF_2O[CF(CF_3)CF_2O]_nCF=CF_2$$

where $R_f$ is a radical selected from the class consisting of fluorine and perfluoroalkyl radicals having from 1 to 10 carbon atoms, $n$ is an integer from one to three inclusive and Me is a radical selected from the class consisting of alkali metals and quaternary ammonium radicals which comprises polymerizing said vinyl ether in an aqueous phase using a free radical initiator.

23. A clear aqueous sirup containing the copolymer of claim 16.

24. The method of forming a polymer of a vinyl ether having the formula $$FSO_2CFR_fCF_2O[CFYCF_2O]_nCF=CF_2$$

where $R_f$ is a radical selected from the class consisting of fluorine and perfluoroalkyl radicals having from 1 to 10 carbon atoms, Y is a radical selected from the class consisting of fluorine and the trifluoromethyl radical, and $n$ is an integer from one to three inclusive, which comprises polymerizing said vinyl ether in contact with an aqueous liquid phase and in the presence of a free radical initiator.

25. An aqueous dispersion in which the dispersed particles are a polymer of a vinyl ether having the formula $$FSO_2CFR_fCF_2O[CFYCF_2O]_nCF=CF$$

where $R_f$ is a radical selected from the class consisting of fluorine and perfluoroalkyl radicals having from 1 to 10 carbon atoms, Y is a radical selected from the class consisting of fluorine and the trifluoromethyl radical, and $n$ is an integer from one to three inclusive.

References Cited by the Examiner
UNITED STATES PATENTS
3,180,895    4/1965    Harris et al. _____ 260—614

OTHER REFERENCES

Lovelace, A. M., Postelnek, William, and Rausch, Douglas A.: Aliphatic Fluorine Compounds, Reinhold Publishing Corporation, 1958 Ed., pages 169–171.

MURRAY TILLMAN, *Primary Examiner.*

J. L. WHITE, *Assistant Examiner.*